(12) United States Patent
Eom et al.

(10) Patent No.: US 10,971,778 B2
(45) Date of Patent: *Apr. 6, 2021

(54) BATTERY PACK

(71) Applicant: LG CHEM, LTD., Seoul (KR)

(72) Inventors: Young-Sop Eom, Daejeon (KR);
Dal-Mo Kang, Daejeon (KR);
Jun-Yeob Seong, Daejeon (KR);
Sung-Chun Yu, Daejeon (KR);
Ki-Youn Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 84 days.

This patent is subject to a terminal disclaimer.

(21) Appl. No.: 16/437,639

(22) Filed: Jun. 11, 2019

(65) Prior Publication Data
US 2019/0296291 A1    Sep. 26, 2019

Related U.S. Application Data

(63) Continuation of application No. 15/117,270, filed as application No. PCT/KR2015/001257 on Feb. 6, 2015, now Pat. No. 10,361,410.

(30) Foreign Application Priority Data

Feb. 17, 2014    (KR) .................... 10-2014-0018027

(51) Int. Cl.
*H01M 2/10*    (2006.01)
*H01M 50/20*    (2021.01)
(Continued)

(52) U.S. Cl.
CPC ....... *H01M 50/20* (2021.01); *H01M 10/4257* (2013.01); *H01M 10/482* (2013.01);
(Continued)

(58) Field of Classification Search
CPC .......... H01M 10/4257; H01M 10/482; H01M 2010/4271; H01M 2200/103;
(Continued)

(56) References Cited

U.S. PATENT DOCUMENTS

2007/0284167 A1    12/2007    Watanabe et al.
2009/0253027 A1    10/2009    Yang et al.
(Continued)

FOREIGN PATENT DOCUMENTS

JP            2006-228526 A      8/2006
KR    10-2007-0110567 A     11/2007
(Continued)

OTHER PUBLICATIONS

International Search Report, issued in PCT/KR2015/001257, dated May 28, 2015.

*Primary Examiner* — Victoria H Lynch
(74) *Attorney, Agent, or Firm* — Birch, Stewart, Kolasch & Birch LLP

(57) ABSTRACT

Disclosed is a battery pack configured to prevent its components such as a cell assembly from being broken or damaged even though a physical force such as vibrations and impacts is applied to the battery pack. The battery pack includes a cell assembly having a plurality of secondary batteries; an electronic component plate having a plate shape and configured to allow at least one electronic component to be mounted thereon; a lower housing configured to have an inner space with an open top and to accommodate the cell assembly and the electronic component plate therein; and an upper housing configured to cover the open top of the lower housing, wherein coupling members are respectively provided between a lower portion of the cell assembly and the lower housing, between an upper portion of the cell assembly and the electronic component plate, between the electronic component plate and the upper housing, and between (Continued)

the lower housing and the upper housing to couple and fix each other.

12 Claims, 5 Drawing Sheets

(51) Int. Cl.
    *H01M 50/581*     (2021.01)
    *H01M 10/42*     (2006.01)
    *H01M 10/48*     (2006.01)

(52) U.S. Cl.
    CPC .. *H01M 50/581* (2021.01); *H01M 2010/4271* (2013.01); *H01M 2200/103* (2013.01); *H01M 2220/20* (2013.01)

(58) Field of Classification Search
    CPC ........... H01M 2220/20; H01M 2/1022; H01M 2/1077; H01M 2/348; Y02E 60/10
    See application file for complete search history.

(56) References Cited

U.S. PATENT DOCUMENTS

| | | |
|---|---|---|
| 2011/0039134 A1 | 2/2011 | Kim et al. |
| 2011/0076521 A1 | 3/2011 | Shimizu et al. |
| 2011/0117401 A1 | 5/2011 | Lee et al. |
| 2012/0103714 A1 | 5/2012 | Choi et al. |
| 2012/0301747 A1 | 11/2012 | Han et al. |
| 2013/0136956 A1 | 5/2013 | Nakano et al. |
| 2013/0249475 A1 | 9/2013 | Kang et al. |
| 2014/0011056 A1 | 1/2014 | Adachi |

FOREIGN PATENT DOCUMENTS

| | | |
|---|---|---|
| KR | 10-2011-0055371 A | 5/2011 |
| KR | 10-2012-0132338 A | 12/2012 |
| KR | 10-2012-0134059 A | 12/2012 |
| WO | WO 2013/168989 A1 | 11/2013 |

BATTERY PACK

This application is a Continuation of U.S. patent application Ser. No. 15/117,270, filed on Aug. 8, 2016, which is the National Phase of PCT International Application No. PCT/KR2015/001257, filed on Feb. 6, 2015, which claims priority to Korean Patent Application No. 10-2014-0018027 filed on Feb. 17, 2014 in the Republic of Korea, the disclosures of which are incorporated herein by reference.

TECHNICAL FIELD

The present disclosure relates to a battery pack including at least one secondary battery, and more particularly, to a battery pack configured so that its components such as a cell assembly having secondary batteries may be stably fixed in a housing, and its manufacturing method.

BACKGROUND ART

Recently, the demand for portable electronic products such as notebooks, video cameras, cellular phones or the like has rapidly increased, and electric vehicles, energy storage batteries, robots, satellites have been actively developed. For this reason, high-performance secondary batteries allowing repeated charging and discharging are being actively studied.

Currently, nickel-cadmium batteries, nickel-metal hydride batteries, nickel-zinc batteries, lithium secondary batteries, and the like are used as commercial secondary batteries. Among them, lithium secondary batteries have little to no memory effect in comparison with nickel-based secondary batteries, and thus lithium secondary batteries are gaining a lot of attention for their advantages of free charging or discharging, low self-discharging, and high energy density.

A lithium secondary battery generally uses lithium oxide and carbonaceous material as a positive electrode active material and negative electrode active material, respectively. The lithium secondary battery includes an electrode assembly in which a positive electrode plate and a negative electrode plate respectively coated with the positive electrode active material and the negative electrode active material are disposed with a separator being interposed between them, and an exterior, namely a battery case, which seals and accommodates the electrode assembly together with an electrolyte.

Generally, a lithium secondary battery may be classified into a can-type secondary battery where the electrode assembly is included in a metal can and a pouch-type battery where the electrode assembly is included in a pouch of an aluminum laminate sheet, depending on the shape of the exterior.

Recently, secondary batteries are widely used not only for small-sized devices such as cellular phones but also middle-sized or large-sized devices such as vehicles and power storages. In particular, along with the exhaustion of carbon energy and the increased interest on environments, hybrid electric vehicles and electric vehicles attract attention globally, for example in US, Europe, Japan and Korea. In such a hybrid electric vehicle or electric vehicle, a battery pack for giving a driving force to a vehicle motor is the most essential part. Since a hybrid electric vehicle or electric vehicle may obtain a driving force by means of charging and discharging of the battery pack, the hybrid electric vehicle or electric vehicle ensures excellent fuel efficiency and exhausts no or reduced pollutants, and for this reason, hybrid electric vehicles and electric vehicles are used more and more.

Generally, a battery pack is configured so that electronic components such as a cell assembly which is a secondary battery aggregation having at least one secondary battery, a battery management system (BMS), a current sensor, a relay, a fuse or the like are included in a housing. When configuring such a battery pack, it is very important how components of the battery pack such as a cell assembly are coupled in the housing.

Further, the battery pack may receive external physical forces such as vibrations and impacts. In particular, a battery pack mounted to an electric vehicle, including a hybrid vehicle, may be frequently exposed to vibrations and impacts due to the nature of the vehicle, and such vibrations and impacts are not weak. Therefore, in order to protect various components of the battery pack from being broken or damaged due to external physical forces, every components of the battery pack, such as a cell assembly, should be stably fixed in the housing without being moved.

However, in an existing battery pack, each component such as a cell assembly is not stably coupled in the housing. In particular, in case of an existing battery pack, a cell assembly is generally fixed in the housing by securing a lower or side surface of the cell assembly. However, if a side surface is fixed, the space for the fixation is required to some extent as a side of the cell assembly, and thus this configuration may not be easily applied to a battery pack having a narrow inner space, and even though this configuration is applied, the battery pack inevitably has an increased volume. In addition, if a lower surface is fixed, when an impact or the like is applied to the battery pack, the impact is focused on the fixation portion at the lower surface of the cell assembly, and thus the fixation portion may be easily broken, which can lead to breakage or damage of the cell assembly, and further the battery pack.

DISCLOSURE

Technical Problem

The present disclosure is designed to solve the problems of the related art, and therefore the present disclosure is directed to providing a battery pack configured to prevent its components such as a cell assembly from being broken or damaged even though a physical force such as vibrations and impacts is applied to the battery pack, its manufacturing method, and a vehicle including such a battery pack.

Other objects and advantages of the present disclosure will be understood from the following descriptions and become apparent by the embodiments of the present disclosure. In addition, it is understood that the objects and advantages of the present disclosure may be implemented by components defined in the appended claims or their combinations.

Technical Solution

In one aspect of the present disclosure, there is provided a battery pack, comprising: a cell assembly having a plurality of secondary batteries; an electronic component plate having a plate shape and configured to allow at least one electronic component to be mounted thereon; a lower housing configured to have an inner space with an open top and to accommodate the cell assembly and the electronic component plate therein; and an upper housing configured to cover the open top of the lower housing, wherein coupling members are respectively provided between a lower portion of the cell assembly and the lower housing, between an upper portion of the cell assembly and the electronic component plate, between the electronic component plate and the upper housing, and between the lower housing and the upper housing to couple and fix each other.

Preferably, the cell assembly may have an assembly hole formed in a lower outer side thereof with a protrusive shape, the lower housing may have a lower protrusion provided at a location corresponding to the assembly hole, and the lower protrusion may be inserted into and coupled to the assembly hole to couple and fix a lower portion of the cell assembly to the lower housing.

Also preferably, the lower protrusion may have a thread formed thereon, and a nut may be coupled to the thread of the lower protrusion at an upper portion of the assembly hole.

Also preferably, the cell assembly may have an assembly protrusion provided thereon, the electronic component plate may have a first plate hole provided at a location corresponding to the assembly protrusion, and the assembly protrusion may be inserted into and coupled to the first plate hole to couple and fix an upper portion of the cell assembly to the center plate.

Also preferably, the assembly protrusion may have a thread formed thereon, and a nut may have coupled to the thread of the assembly protrusion at an upper portion of the first plate hole.

Also preferably, the electronic component plate may have a second plate hole in at least one side thereof, the upper housing may have a first upper hole formed at a location corresponding to the second plate hole, and a bolt may be inserted into and coupled to the second plate hole and the first upper hole to couple and fix the electronic component plate to the upper housing.

Also preferably, threads may be formed at the bolt and the second plate hole with shapes corresponding to each other, and the bolt may be screwed with and fixed to the second plate hole.

Also preferably, the upper housing may have a second upper hole formed in a rim portion thereof, the lower housing may have a lower hole formed in a rim portion thereof, and a bolt may be inserted into and coupled to the second upper hole and the lower hole to couple and fix the upper housing to the lower housing.

Also preferably, threads may be formed at the bolt and the second upper hole with shapes corresponding to each other, and the bolt may be screwed with and fixed to the second upper hole.

Also preferably, the battery pack may further comprise a sealing member provided at an upper portion of a side surface of the lower housing.

Also preferably, the electronic component may include at least one of a battery management system (BMS), a current sensor, a relay and a fuse.

In another aspect of the present disclosure, there is also provided a vehicle, which comprises the battery pack described above.

Also, in another aspect of the present disclosure, there is also provided a method for manufacturing a battery pack, comprising: preparing a cell assembly having a plurality of secondary batteries, an electronic component plate on which at least one electronic component is mounted, a lower housing having an empty space therein, and an upper housing; coupling and fixing an upper portion of the cell assembly to the electronic component plate; accommodating the cell assembly in the inner space of the lower housing; coupling and fixing a lower portion of the cell assembly to the lower housing; coupling and fixing the electronic component plate to the upper housing; and coupling and fixing the lower housing to the upper housing.

Advantageous Effects

According to an embodiment of the present disclosure, every component of a battery pack, such as a cell assembly, may be stably coupled and fixed in a housing.

Therefore, in this embodiment of the present disclosure, even though vibrations or impacts are applied to the battery pack, various components such as the cell assembly may not be easily broken or damaged.

In particular, according to an embodiment of the present disclosure, since the impact applied to the cell assembly may not be focused on a specific portion such as the lower surface but be dispersed to various portions, it is possible to more efficiently prevent the cell assembly from being damaged or broken.

In addition, according to an embodiment of the present disclosure, since the cell assembly and electronic components may be stably fixed and coupled without needing much additional space for the coupling, the battery pack may have a compact design.

Further, the present disclosure may be more effectively applied to a battery pack for an electric vehicle, which may be exposed to vibrations and impacts more frequently.

In addition, according to an embodiment of the present disclosure, the cell assembly and electronic components may be stably fixed, and also the battery pack may be assembled easily without any complicated process.

DESCRIPTION OF DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
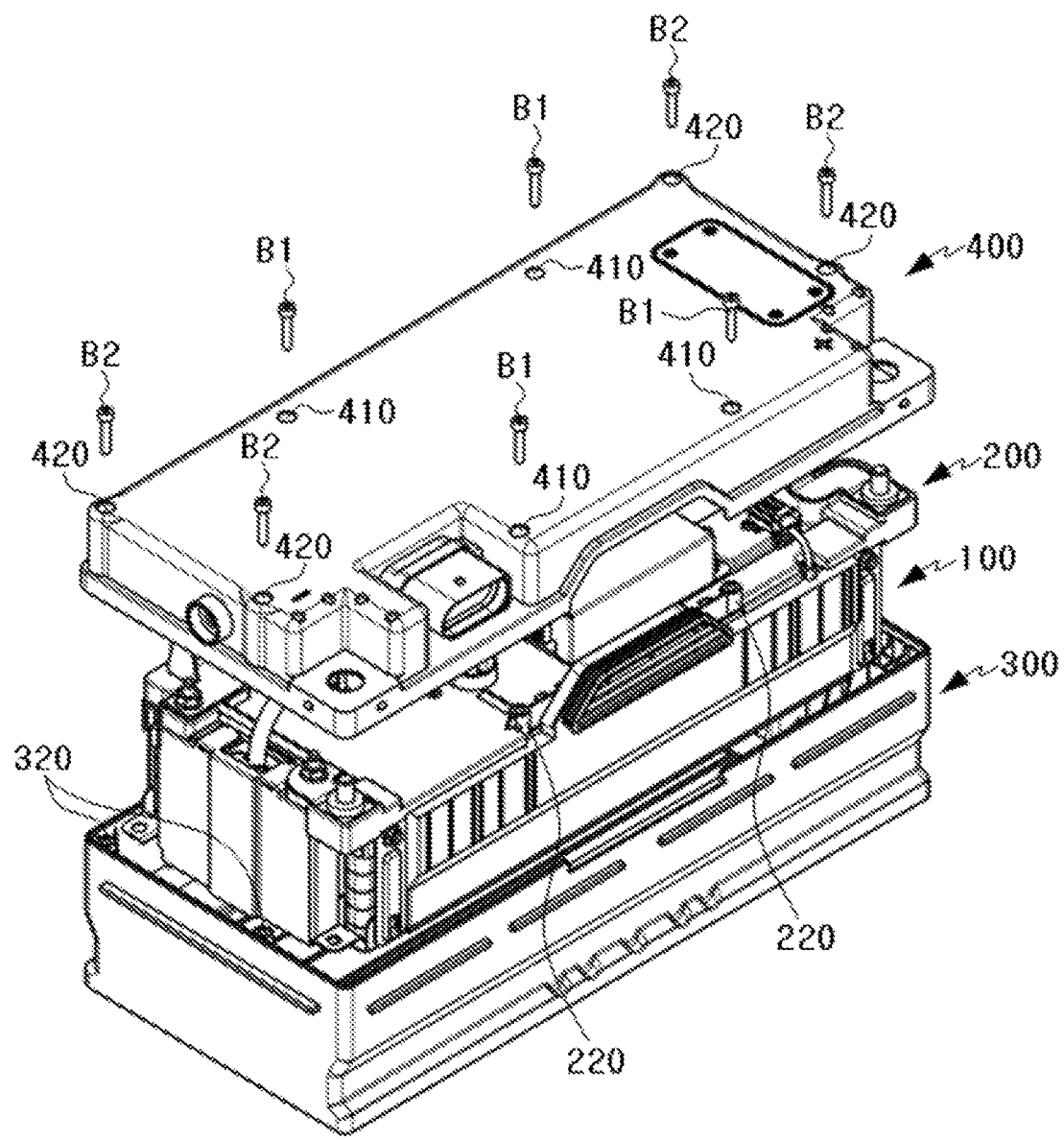
FIG. 1 is an exploded perspective view schematically showing a battery pack according to an embodiment of the present disclosure.

FIG. 1 is an exploded perspective view schematically showing a battery pack according to an embodiment of the present disclosure.

Referring to FIG. 1, a battery pack according to the present disclosure includes a cell assembly 100, an electronic component plate 200, a lower housing 300 and an upper housing 400.

The cell assembly 100 has at least one secondary battery. In particular, in the battery pack, the cell assembly 100 may be a secondary battery aggregation having a plurality of secondary batteries. Here, the plurality of secondary batteries may be pouch-type secondary batteries. In this case, the pouch-type secondary batteries may be configured to be stacked in one direction, for example in a vertical direction.

Meanwhile, the cell assembly 100 may include a stacking frame for stacking a plurality of secondary batteries. The stacking frame is a component used for stacking secondary batteries, and the stacking frame may hold secondary batteries to prevent shaking of the secondary batteries, and many stacking frames may be stacked with each other to guide assembling of secondary batteries. The stacking frame may also be called with various terms, for example a cartridge, and may have a rectangular ring shape with a hollow center. In this case, four edges of the stacking frame may be located at the outer circumference of a pouch-type secondary battery, respectively.

The electronic component plate 200 may be configured with a plate shape having broad surfaces at its upper and lower portions. In addition, on the broad upper surface of the electronic component plate 200, electronic components may be mounted. The configuration of the electronic component plate 200 will be described in more detail with reference to FIG. 2.

Figure 2:
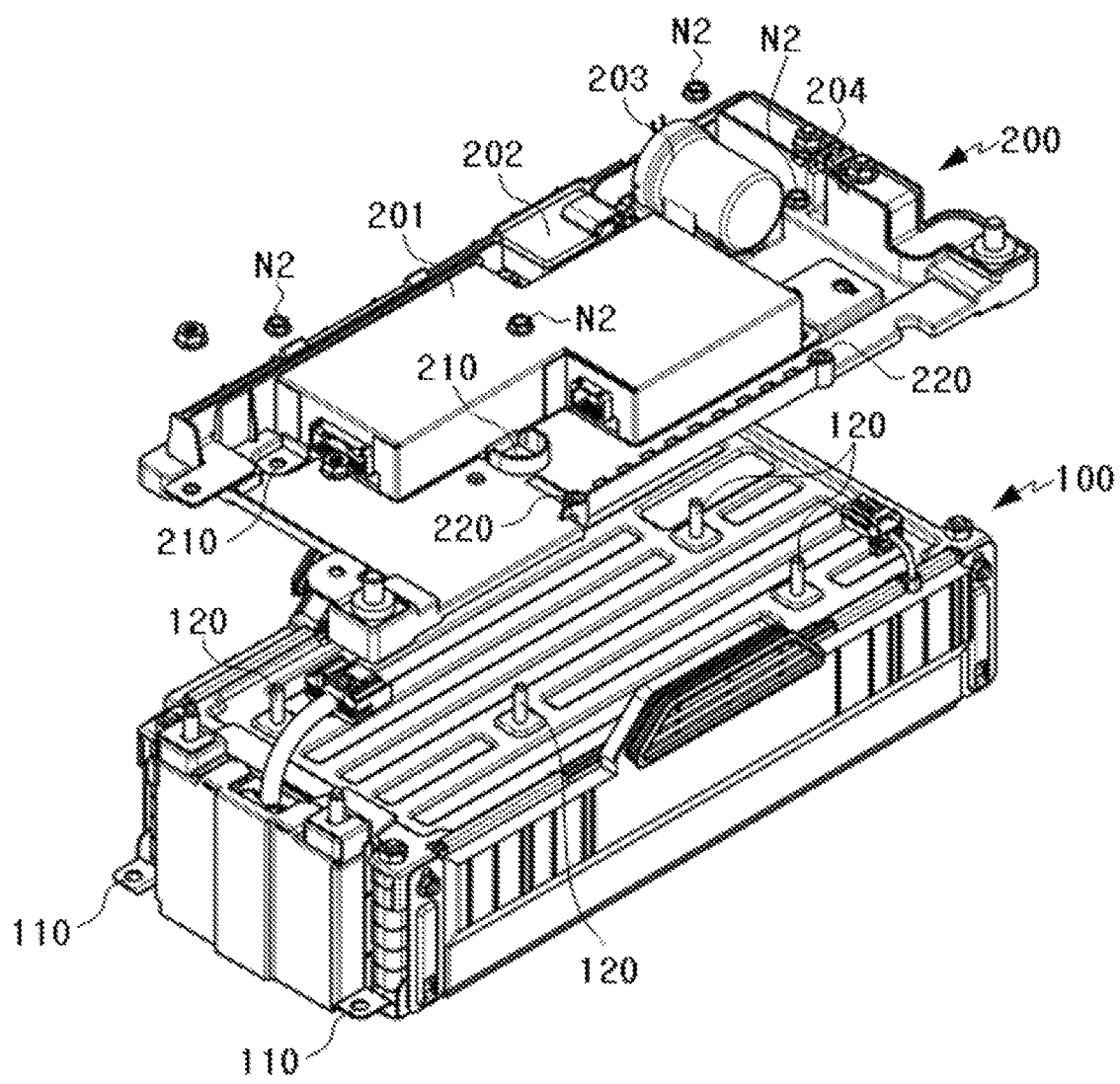
FIG. 2 is an exploded perspective view schematically showing only a cell assembly and an electronic component plate, employed at the battery pack of FIG. 1.

FIG. 2 is an exploded perspective view schematically showing only the cell assembly 100 and the electronic component plate 200, employed at the battery pack of FIG. 1.

As shown in FIG. 2, at least one electronic component may be mounted at an upper portion of the electronic component plate 200. Here, the electronic component mounted on the electronic component plate 200 may include at least one of a battery management system (BMS) 201, a current sensor 202, a relay 203 and a fuse 204.

Here, the BMS 201 means a battery management device for controlling charging/discharging operations of the battery pack as a whole, and the BMS is commonly included in a battery pack.

In addition, the current sensor 202 is a component for sensing a charge/discharge current of the battery pack, and the relay 203 is a switching component for selectively opening or closing a charge/discharge path on which a charge/discharge current of the battery pack flows. In addition, the fuse 204 is provided on the charge/discharge path of the battery pack and is fused off to cut the flow of the charge/discharge current when an abnormal situation occurs at the battery pack. The current sensor, the relay and the fuse may exchange data with the BMS and be controlled by the BMS.

The BMS, the current sensor, the relay and the fuse are well known to those skilled in the art, and thus they are not described in detail here.

At the electronic component plate 200, at least one bus bar may be mounted in addition to the electronic components. In addition, the electronic component plate 200 may have a pack terminal exposed out of the upper housing. The pack terminal is a terminal used when connecting an external charging/discharging device to the battery pack and may include a positive electrode pack terminal and a negative electrode pack terminal. At this time, the bus bar may be used as a charge/discharge path by connecting an electrode terminal of the cell assembly 100 to the pack terminal, and may electrically connect various electronic components such as a current sensor, a relay and a fuse. In particular, the bus bar may include a positive electrode bus bar and a negative electrode bus bar. Here, the positive electrode bus bar may connect a positive electrode terminal of the cell assembly 100 to the positive electrode pack terminal, and the negative electrode bus bar may connect a negative electrode terminal of the cell assembly 100 to the negative electrode pack terminal. As described above, the bus bar is a component for electric connection and thus may be made of a material having electric conductivity. In particular, in order to ensure mechanical strength to same extent, the bus bar may be formed with a metal material such as copper.

As shown in FIG. 2, the electronic component plate 200 may be located at an upper portion of the cell assembly 100. In this embodiment, the cell assembly 100 and the electronic component plate 200 may be easily assembled, and the electronic component mounted on the electronic component plate 200 may also be easily connected to the cell assembly 100. Moreover, the electronic component mounted on the electronic component plate 200 may be easily separated in an upward direction and may also be easily mounted from the above, thereby ensuring easy exchange of each electronic component.

The lower housing 300 has an empty space therein, and the inner space may be opened at its top. In addition, the lower housing 300 may allow the cell assembly 100 and the electronic component plate 200 to be accommodated in the inner space. Since the lower housing 300 may serve as an exterior of the battery pack, the lower housing 300 may give structural stability to the battery pack and protect components such as the cell assembly 100 and the electronic component plate 200, accommodated therein, against external physical elements such as impacts and substances.

The upper housing is located at an upper portion of the lower housing 300 and may be configured to cover the open top of the lower housing 300. In other words, the upper housing may cover the opening of the lower housing 300 so that various components such as the cell assembly 100 and the electronic component plate 200 are not exposed out but protected. Here, the upper housing may have an empty space therein by having an upwardly concave shape, and the cell assembly 100 and the electronic component plate 200 may be at least partially accommodated in the inner space of the upper housing.

As described above, the battery pack according to the present disclosure may include the cell assembly 100, the electronic component plate 200, the lower housing 300 and the upper housing, and these components may be coupled and fixed to each other by means of coupling members.

In particular, the lower portion of the cell assembly 100 and the lower housing 300 may be coupled and fixed by means of a coupling member, and the upper portion of the cell assembly 100 and the electronic component plate 200 may be coupled and fixed by means of another coupling member. In addition, the electronic component plate 200 and the upper housing may be coupled and fixed by means of still another coupling member, and the lower housing 300 and the upper housing may also be coupled and fixed by means of further another coupling member. At this time, the coupling member for coupling components may be integrated to each component or separately provided from each component.

Preferably, in order to couple and fix the lower portion of the cell assembly 100 and the lower housing 300, as shown in FIG. 2, the cell assembly 100 may have an assembly hole 110 formed in a lower outer side thereof with a protrusive shape. In addition, the lower housing 300 may have a lower protrusion 310 provided on an upper surface thereof at a location corresponding to the assembly hole 110 of the cell assembly 100 to protrude upwards. At this time, a thread may be formed on an outer surface of the lower protrusion. The coupling and fixing configuration between the lower portion of the cell assembly 100 and the lower housing 300 will be described in more detail with reference to FIG. 3.

Figure 3:
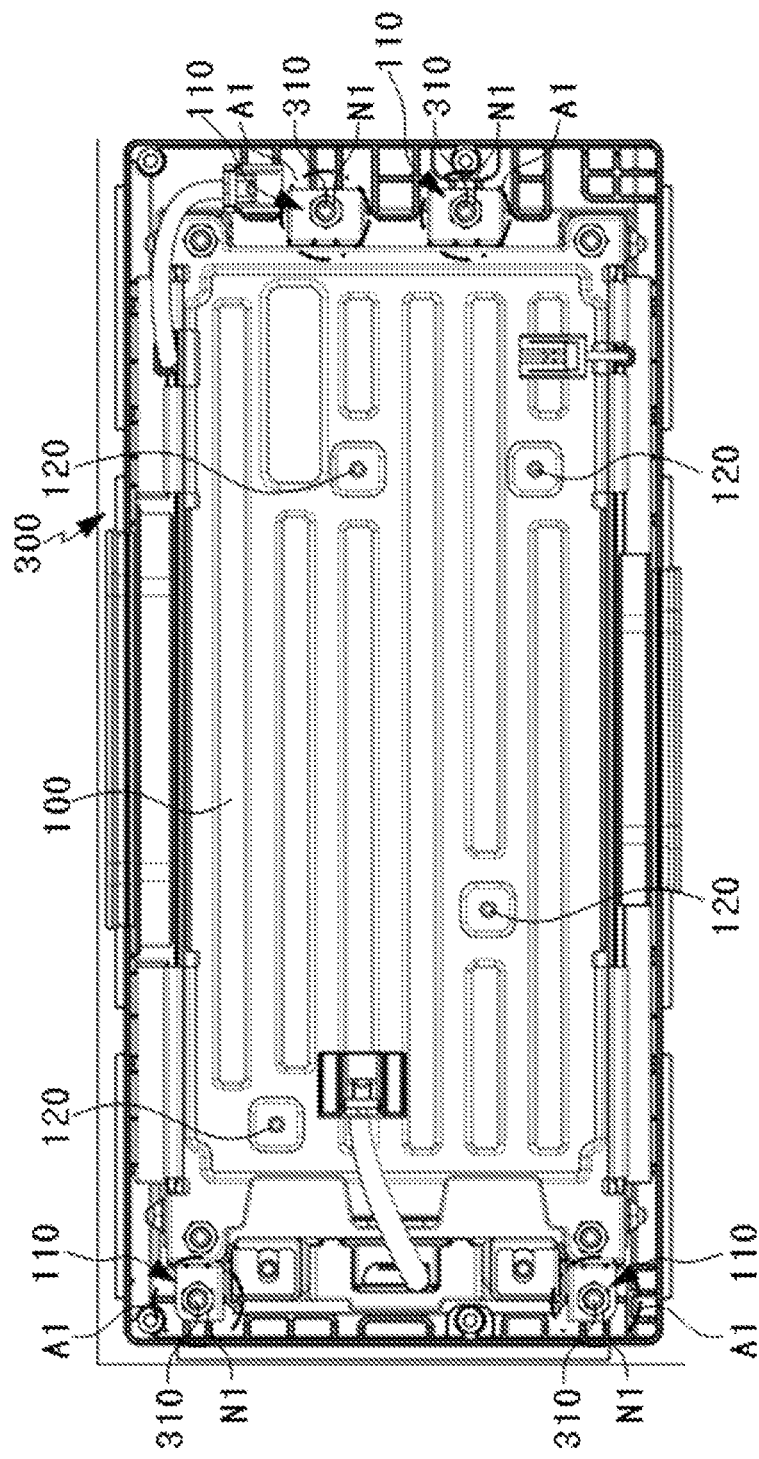
FIG. 3 is a diagram showing the battery pack of FIG. 1, except for an upper housing and an electronic component plate, observed from the above.

FIG. 3 is a diagram showing the battery pack of FIG. 1, except for the upper housing and the electronic component plate 200, observed from the above.

Referring to FIG. 3, as depicted in a portion A1, a plurality of assembly holes 110 may be provided at a lower outer side of the cell assembly 100 to protrude in a horizontal direction. In other words, two assembly holes 110 may be formed to protrude at a left side of the cell assembly 100, and other two assembly holes 110 may be formed to protrude at a right side of the cell assembly 100. In addition, lower protrusions 310 may be formed on the upper surface of the lower housing 300 at locations corresponding to the four assembly holes 110. Therefore, if the cell assembly 100 is accommodated in the inner space of the lower housing 300, the four lower protrusions 310 may be respectively inserted into and coupled through the four assembly holes 110. Due to the coupling between the assembly holes 110 and the lower protrusions 310, the cell assembly 100 and the lower housing 300 may be coupled and fixed to each other. In particular, in this configuration of the present disclosure, it is possible to prevent the cell assembly 100 from moving in a horizontal direction inside the lower housing 300.

Here, a thread may be formed at an outer surface of the lower protrusion 310, and a nut N1 may be coupled to the thread of the lower protrusion 310 at an upper portion of the assembly hole 110. In other words, in a state where the lower protrusion 310 is inserted into the assembly hole 110, the nut N1 may be coupled to the upper portion of the cell assembly 100 to fix the cell assembly 100. In this configuration of the present disclosure, by means of the nut N1, it is possible to prevent the assembly hole 110 from being separated from the lower protrusion 310 or moving in an inserted state. Therefore, the cell assembly 100 and the lower housing 300 may be fixed more stably.

Also preferably, in order to couple and fix the upper portion of the cell assembly 100 to the electronic component plate 200, the cell assembly 100 may have an assembly protrusion 120 at an upper portion thereof. The coupling configuration of the cell assembly 100 and the electronic component plate 200 will be described in more detail with reference to FIGS. 2 to 4.

Figure 4:
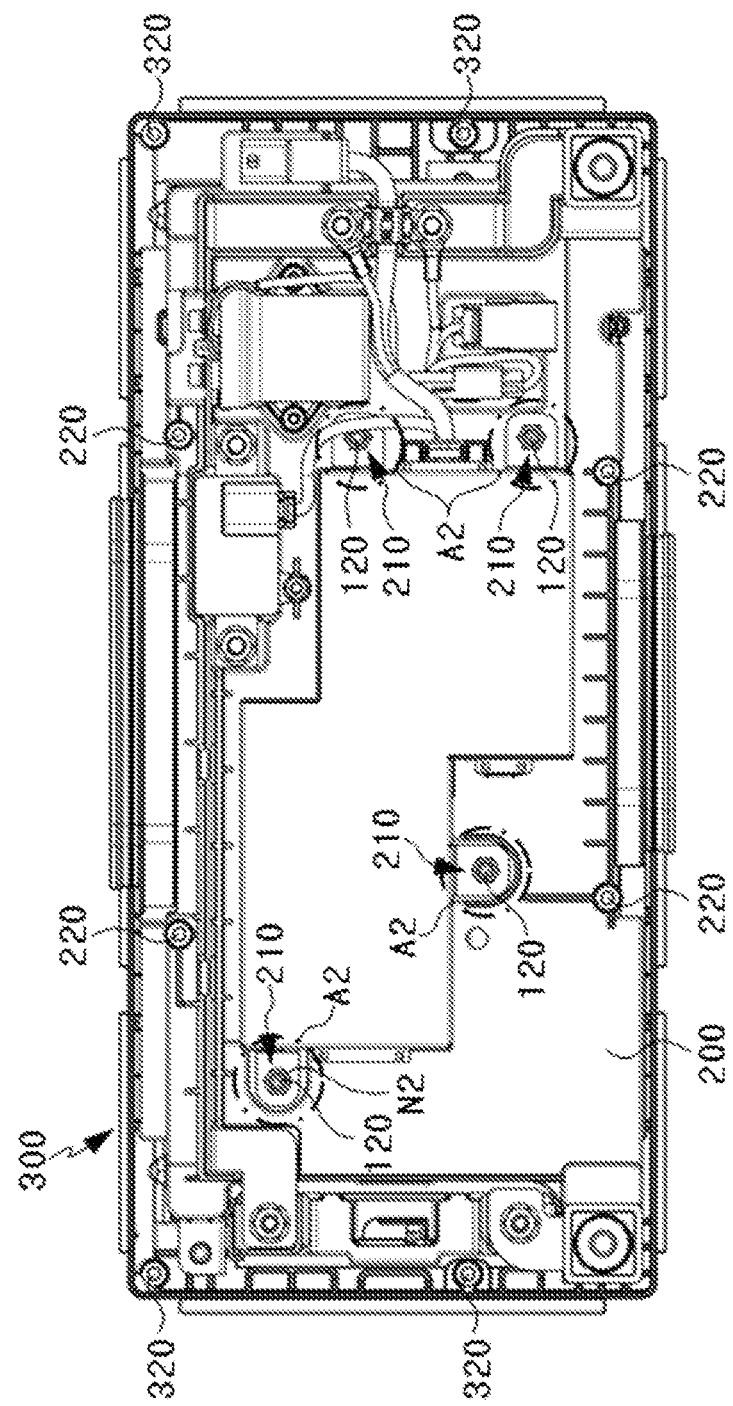
FIG. 4 is a diagram showing the battery pack of FIG. 1, except for an upper housing, observed from the above.

FIG. 4 is a diagram showing the battery pack of FIG. 1, except for the upper housing, observed from the above.

In more detail, referring to FIGS. 2 to 4, a plurality of assembly protrusions 120 are provided at the upper portion of the cell assembly 100 and may be formed to protrude upwards. In addition, the electronic component plate 200 may have first plate holes 210 formed at locations corresponding to the assembly protrusions 120. Therefore, if the electronic component plate 200 is placed on the upper portion of the cell assembly 100, the plurality of assembly protrusion 120 may be inserted into and coupled to the corresponding first plate holes 210, as indicated in the portion A2 of FIG. 4. Due to the coupling of the assembly protrusion 120 and the first plate hole 210, the cell assembly 100 and the electronic component plate 200 may be coupled and fixed to each other. In particular, in this configuration of the present disclosure, it is possible to prevent the electronic component plate 200 from moving in a horizontal direction at an upper portion of the cell assembly 100.

Here, a thread may be formed at an outer surface of the assembly protrusion 120, and a nut N2 may be coupled to the thread of the assembly protrusion 120 at an upper portion of the first plate hole 210. In other words, in a state where the assembly protrusion 120 is inserted into the first plate hole 210, the nut N2 may be coupled to the upper portion of the electronic component plate 200 to fix the electronic component plate 200. In this configuration of the present disclosure, by means of the nut N2, it is possible to prevent the first plate hole 210 of the electronic component plate 200 from being separated from the assembly protrusion 120 or moving in an inserted state. Therefore, the cell assembly 100 and the electronic component plate 200 may be fixed more stably.

Also preferably, in order to couple and fix the electronic component plate 200 to the upper housing, the electronic component plate 200 may have a second plate hole 220 formed in at least one side thereof. In addition, the upper housing may have a first upper hole 410 formed at a location corresponding to the second plate hole 220.

In more detail, referring to FIGS. 1 to 4, a plurality of second plate holes 220, for example four second plate holes 220, may be formed in the electronic component plate 200. In addition, in the upper housing, a plurality of first upper holes 410, for example four first upper holes 410, may be formed at location s corresponding to the second plate hole 220. At this time, the first upper hole 410 may be formed to entire pass through the upper housing. In this case, a first bolt B1 may be inserted through the first upper hole 410 and coupled into the second plate hole 220. Therefore, by coupling the first bolt B1 with the first upper hole 410 and the second plate hole 220, the electronic component plate 200 and the upper housing may be coupled and fixed to each other.

Here, a thread may be formed at an outer surface of the first bolt B1. In addition, in the second plate hole 220, a thread may be formed with a shape corresponding to the thread of the first bolt B1. Therefore, the first bolt B1 may be screwed with and fixed to the second plate hole 220. In this configuration of the present disclosure, the coupling between the first bolt B1 and the second plate hole 220 may be stably maintained. In addition, since the first bolt B1 may be inserted into the second plate hole 220 of the electronic component plate 200 through the first upper hole 410 at the upper portion of the upper housing, the electronic component plate 200 and the upper housing may be coupled easily, and it is not needed to separately couple a nut or the like to the lower portion of the electronic component plate 200.

Also preferably, in order to couple and fix the upper housing to the lower housing 300, a second upper hole 420 may be formed in a rim portion of the upper housing. In addition, the lower housing 300 may have a lower hole 320 formed at a location corresponding to the second upper hole 420 of the rim portion.

In more detail, referring to FIGS. 1 and 4, a plurality of lower holes 320, for example four lower holes 320, may be formed in the lower housing 300. In particular, the lower housing 300 may have a lower surface and side surfaces to form an accommodation space therein and may not have an upper surface so that its top is opened. At this time, the lower hole 320 may be located at an uppermost portion of the lower housing 300, which comes into contact with the upper housing. The uppermost portion of the lower housing 300 may be regarded as a rim portion where side surfaces are positioned, and the lower hole 320 may be formed in the rim portion, namely an upper portion of the side surface of the lower housing 300, in a downward direction.

The upper housing may have a plurality of second upper holes 420, for example four second upper holes 420, formed at locations corresponding to the lower holes 320 of the lower housing 300. Therefore, if the upper housing is sized and shaped similar to the lower housing 300, the second upper holes 420 may also be formed in a rim portion of the upper housing.

In this configuration of the lower housing 300 and the upper housing, a second bolt B2 may be inserted through the second upper hole 420 and coupled into the lower hole 320. Therefore, by coupling the second bolt B2 to the second upper hole 420 and the lower hole 320, the upper housing and the lower housing 300 may be coupled and fixed to each other.

Here, a thread may be formed at an outer surface of the second bolt B2. In addition, the second upper hole 420 may also have a thread formed corresponding to the thread of the second bolt B2. Therefore, the second bolt B2 may be screwed with and fixed to the second plate hole 220. In this configuration of the present disclosure, the coupling between the second bolt B2 and the second plate hole 220 may be stably maintained. In addition, since the second bolt B2 is inserted into the lower hole 320 through the second upper hole 420 at the upper portion of the upper housing, the lower housing 300 and the upper housing may be coupled easily, and it is not needed to separately couple a nut or the like to the second bolt B2.

Meanwhile, the lower housing 300 and the upper housing may be configured to have an approximately rectangular shape, when being observed from the above. At this time, the lower holes 320 and the second upper holes 420 may be formed at least in edge portions of the lower housing 300 and the upper housing with a rectangular shape. In this configuration of the present disclosure, the coupling between the lower housing 300 and the upper housing may be stably maintained through the entire regions.

Preferably, the battery pack according to the present disclosure may further include a sealing member at an upper portion of the side surface of the lower housing 300.

The sealing member may be interposed between the lower housing 300 and the upper housing to seal the space between the lower housing 300 and the upper housing. For this, the sealing member may be located at rim portions of the lower housing 300 and the upper housing which come into contact with each other. In addition, if the lower housing 300 and the upper housing are configured with a rectangular shape, the sealing member may also have a rectangular ring shape along the rim portions of the lower housing 300 and the upper housing.

The sealing member may be made of polymer material with elasticity, for example rubber, since it is a component for sealing the lower housing 300 and the upper housing.

The battery pack according to the present disclosure may be applied to a vehicle such as an electric vehicle and a hybrid vehicle. In other words, the vehicle according to the present disclosure may include the battery pack according to the present disclosure as described above. In particular, the battery pack for a vehicle may be frequently exposed to external physical forces such as vibrations and impacts, and such vibrations and impacts may be serious. However, in the battery pack according to the present disclosure, since the lower portion of the cell assembly 100 is coupled and fixed to the lower housing 300, the upper portion of the cell assembly 100 is coupled and fixed to the electronic component plate 200, the electronic component plate 200 is coupled and fixed to the upper housing, and the lower housing 300 is coupled and fixed to the upper housing. Therefore, each component of the battery pack is stably fixed without moving, and thus it is possible to effectively prevent each component from being broken or damaged due to inertia, vibrations, impacts or the like. In particular, it is possible to more effectively prevent the cell assembly 100 from being broken, by preventing a force from being focused to a specific region of the cell assembly 100 in the pack housing.

Hereinafter, a method for manufacturing a battery pack according to an embodiment of the present disclosure will be described in brief.

Figure 5:
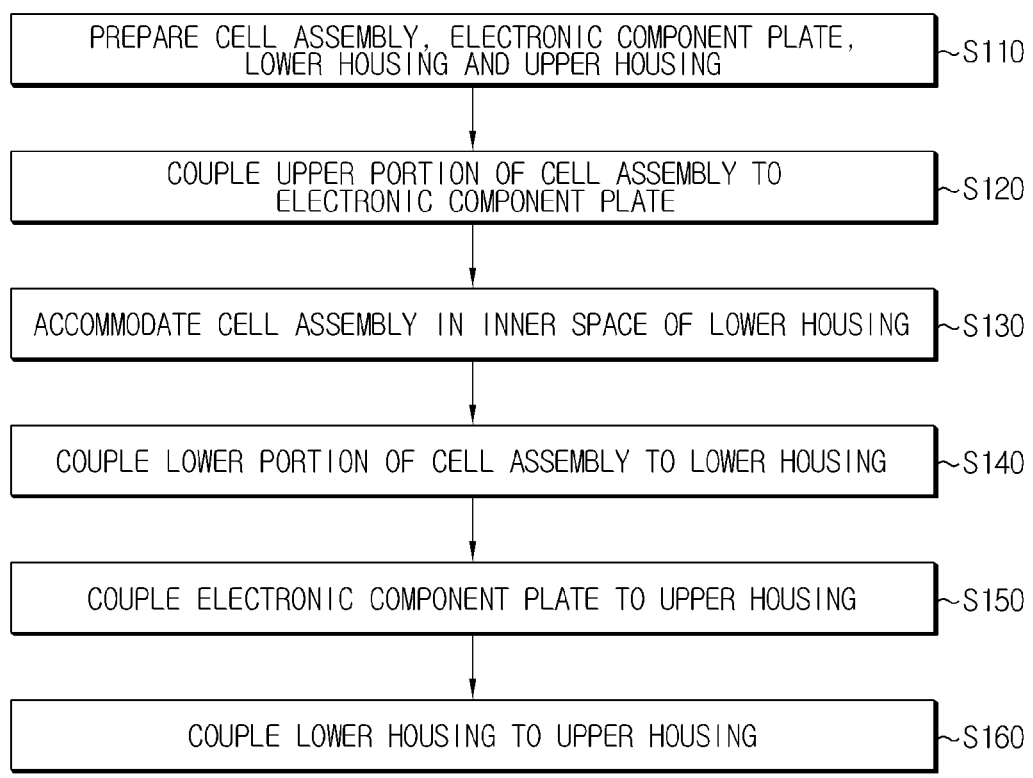
FIG. 5 is a schematic flowchart for illustrating a method for manufacturing a battery pack according to an embodiment of the present disclosure.

FIG. 5 is a schematic flowchart for illustrating a method for manufacturing a battery pack according to an embodiment of the present disclosure.

As shown in FIG. 5, in the method for manufacturing a battery pack according to the present disclosure, first, a cell assembly 100 having a plurality of secondary batteries, an electronic component plate 200 on which at least one electronic component is mounted, and a lower housing 300 and an upper housing having an empty space therein are prepared (S110).

Next, the electronic component plate 200 is placed on the cell assembly 100, and the upper portion of the cell assembly 100 is coupled and fixed to the electronic component plate 200 (S120). After that, the cell assembly 100 to which the electronic component plate 200 is coupled is accommodated in the inner space of the lower housing 300 (S130). Next, the lower portion of the cell assembly 100 is coupled and fixed to the lower housing 300 (S140), and the open top of the lower housing 300 is covered by the upper housing. After that, the electronic component plate 200 is coupled and fixed to the upper housing (S150), and then the lower housing 300 is coupled and fixed to the upper housing (S160).

Meanwhile, the process depicted in FIG. 5 is just an example, and the present disclosure is not limited thereto. For example, Step S120 may be performed after Step S140, and Step S150 may be performed after Step S160.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Meanwhile, when the terms indicating up, down, left and right directions are used in the specification, it is obvious to those skilled in the art that these merely represent relative locations for convenience in explanation and may vary based on a location of an observer or a shape in which an object is placed.

What is claimed is:

1. A battery pack, comprising:
a cell assembly having a plurality of secondary batteries;
an electronic component plate directly placed on an upper portion of the cell assembly and having a plate shape and configured to allow at least one electronic component to be mounted thereon;
a lower housing configured to have an inner space with an open top and to accommodate the cell assembly and the electronic component plate in the inner space; and
an upper housing configured to cover the open top of the lower housing,
wherein coupling members are respectively provided between a lower portion of the cell assembly and the lower housing, between the upper portion of the cell assembly and the electronic component plate, between the electronic component plate and the upper housing, and between the lower housing and the upper housing to couple and fix each other,
wherein the cell assembly has an assembly protrusion provided thereon, the electronic component plate has a first plate hole provided at a location corresponding to the assembly protrusion, and the assembly protrusion is inserted into and coupled to the first plate hole to couple and fix the upper portion of the cell assembly to the electronic component plate, and
wherein an assembly hole provided at a lower outer side of the cell assembly to protrude in a horizontal direction, and a lower protrusion is formed on an upper surface of the lower housing at a location corresponding to the assembly hole to insert into the assembly hole.

2. The battery pack according to claim 1,
wherein the lower protrusion is coupled to the assembly hole to couple and fix the lower portion of the cell assembly to the lower housing.

3. The battery pack according to claim 2,
wherein the lower protrusion has a thread formed thereon, and a nut is coupled to the thread of the lower protrusion at an upper portion of the assembly hole.

4. The battery pack according to claim 1,
wherein the assembly protrusion has a thread formed thereon, and a nut is coupled to the thread of the assembly protrusion at an upper portion of the first plate hole.

5. The battery pack according to claim 1,
wherein the electronic component plate has a second plate hole in at least one side thereof, the upper housing has a first upper hole formed at a location corresponding to the second plate hole, and a bolt is inserted into and coupled to the second plate hole and the first upper hole to couple and fix the electronic component plate to the upper housing.

6. The battery pack according to claim 5,
wherein threads are formed at the bolt and the second plate hole with shapes corresponding to each other, and the bolt is screwed with and fixed to the second plate hole.

7. The battery pack according to claim 1,
wherein the upper housing has a second upper hole formed in a rim portion thereof, the lower housing has a lower hole formed in a rim portion thereof, and a bolt is inserted into and coupled to the second upper hole and the lower hole to couple and fix the upper housing to the lower housing.

8. The battery pack according to claim 7,
wherein threads are formed at the bolt and the second upper hole with shapes corresponding to each other, and the bolt is screwed with and fixed to the second upper hole.

9. The battery pack according to claim 1, further comprising:
a sealing member provided at an upper portion of a side surface of the lower housing.

10. The battery pack according to claim 1,
wherein the electronic component includes at least one of a battery management system (BMS), a current sensor, a relay or a fuse.

11. A vehicle, which comprises the battery pack according to claim 1.

12. A method for manufacturing a battery pack, comprising:
preparing a cell assembly having a plurality of secondary batteries, an electronic component plate on which at least one electronic component is mounted, a lower housing having an empty inner space therein, and an upper housing;
placing the electronic component plate directly on an upper portion of the cell assembly and coupling and fixing the upper portion of the cell assembly to the electronic component plate;
accommodating the cell assembly and the electronic component plate in the inner space of the lower housing;
coupling and fixing a lower portion of the cell assembly to the lower housing;
coupling and fixing the electronic component plate to the upper housing; and
coupling and fixing the lower housing to the upper housing,
wherein the cell assembly has an assembly protrusion provided thereon, the electronic component plate has a first plate hole provided at a location corresponding to the assembly protrusion, and the assembly protrusion is inserted into and coupled to the first plate hole to couple and fix the upper portion of the cell assembly to the electronic component plate, and
wherein an assembly hole provided at a lower outer side of the cell assembly to protrude in a horizontal direction, and a lower protrusion is formed on an upper surface of the lower housing at a location corresponding to the assembly hole to insert into the assembly hole.

* * * * *